US007278569B2

(12) United States Patent
Cohen et al.

(10) Patent No.: US 7,278,569 B2
(45) Date of Patent: Oct. 9, 2007

(54) COMBINATION REFRIGERATOR

(76) Inventors: Marc Leon Cohen, 2940 Cimini Ct., Henderson, NV (US) 89052; Mario A. Agrario, 14 Dark Star Ct., Edgewater, MD (US) 21037

( * ) Notice: Subject to any disclaimer, the term of this patent is extended or adjusted under 35 U.S.C. 154(b) by 228 days.

(21) Appl. No.: 11/105,786

(22) Filed: Apr. 14, 2005

(65) Prior Publication Data

US 2005/0279122 A1 Dec. 22, 2005

Related U.S. Application Data

(60) Provisional application No. 60/562,022, filed on Apr. 14, 2004.

(51) Int. Cl.
*G06K 15/00* (2006.01)

(52) U.S. Cl. ...................... 235/378; 235/381; 235/435; 62/441

(58) Field of Classification Search ................ 235/378, 235/435, 440, 376; 221/81; 324/246; 62/441, 62/126
See application file for complete search history.

(56) References Cited

U.S. PATENT DOCUMENTS 6,055,823 A * 5/2000 Baker et al. .................. 62/265
6,456,067 B1 * 9/2002 Ward .......................... 324/236
6,874,684 B1 * 4/2005 Denenberg et al. ......... 235/381

* cited by examiner

*Primary Examiner*—Seung Ho Lee
(74) *Attorney, Agent, or Firm*—Ober/Kaler; Royal W. Craig

(57) ABSTRACT

A dual side-by-side refrigerator having a courtesy section and a paid-vend section both cooled by a single cooling unit. A frontal door or double-hung doors are mounted at the front of the cabinet to cover both courtesy and paid-vend sections. An array of sensors including product-removal sensors in the paid-vend section detect removal of products, and door-open sensors the opening of door(s). A programmable controller is connected to all of the sensors for compiling data therefrom and for communicating it to a hotel front desk, and to room service. The fully-monitored refrigerator simplifies and improves housekeeping services because empty containers and wrapper are not left for the next guest, and refrigerators which were not opened since the last cleaning need not be restocked and/or cleaned. Finally, it helps managers oversee housekeeping because a full data compilation is kept, including the date upon which each refrigerator required cleaning/restocking, and the date that it was actually cleaned/restocked.

16 Claims, 7 Drawing Sheets

COMBINATION REFRIGERATOR

CROSS-REFERENCE TO RELATED APPLICATIONS

The present application derives priority from U.S. Provisional Patent Application No. 60/562,022; filed: Apr. 14, 2004.

BACKGROUND OF THE INVENTION

1. Field of the Invention

The present invention relates to hotel minibars and, in more particularly, to a combination hotel refrigerator having a cash bar (a vend side from which cold beverage, drink cans and snacks are obtained for a fee), plus a courtesy space (a courtesy side for non-fee storage of guest personal items). The refrigerator includes a control and monitoring system to allow the front desk to selectively lock/unlock the cash bar at check-in, and for monitoring both sides and automatically tallying the cash bar usage at check-out as well as indicating to the hotel room services department when the cash bar needs cleaning and restocking and when the courtesy space needs cleaning (thereby avoiding subsequent guests from encountering leftovers).

2. Description of the Background

Minibars are now commonplace in hotel rooms, largely because guests demand them. The demand is attributable to the added convenience since guests no longer need to leave their room to find sundries. A wide variety of beverage and drink cans for the various tastes of the guests can be provided in-room so that any paying guest can take beverages and drinks if and when he pleases.

Examples include U.S. Pat. No. 4,869,395 to Rubbmark Sep. 26, 1989 (Aktiebolaget Electrolux) which shows a vending machine with interchangeable magazines detachably fixed in compartments of the cabinet. The articles are removable through a flap of each magazine and the magazines are individually removable through a front opening of the cabinet for refilling with new articles.

U.S. Pat. No. 5,613,620 to Center et al. Mar. 25, 1997 shows a co-dispenser for dispensing snack food products and beverages from a single machine.

In all the above cases keeping track of vend sales from minibars can be a daunting task for the front desk. Thankfully, there are automatic minibar management systems that have been developed which network together all of a hotel's minibars, and which automatically monitor removal of pay items from the minibars and attribute the charges to the guest's invoice. For example, Bartech Automatic Systems sells the eFridge® network system, which records all handlings in real time and charges guest folios, and consolidates information for the front desk.

As an incidental benefit, the Bartech eFridge system described above allows hotels to track customer demographics and preferences, and field results have shown a variety of preferences and problems with existing minibars. It is now known that guests prefer to have a vend-side cash bar for commercial vending of drink cans and snacks which are obtained for a fee, plus a courtesy space for non-fee storage of guest personal items (in some cases free in-room ice service).

This is recognized by U.S. Pat. No. 6,286,710 to Paek Sep. 11, 2001 which shows a vending machine with ice-box for a hotel room, etc. that serves the paying guest of the room with cold water and personal articles as a room service and enables them to conveniently purchase beverages or side dishes. The device has a cabinet-type body with an ice-box compartment for keeping food in the defined cold region of the main body, and a vending machine reservation compartment located adjacent to the ice-box which releases beverage and drink cans according to a specified order condition.

It is also known that a hotel best serves its guests by selectively locking/unlocking the cash bar at check-in according to the guests preference, and by scrupulously maintaining both the vend-side cash bar (to keep it clean and stocked) and the courtesy space (to keep it clean and empty). Otherwise new guests are confronted with the prior guest's empty cans and wrappers. This can best be accomplished by incorporating an automatic minibar management system into a combination vend/courtesy refrigerator as above that not only allows the front desk to selectively lock/unlock the cash bar at check-in, but also monitors both sides and automatically tallies the cash bar usage at check-out, as well as indicates to the hotel room services department when the cash bar needs cleaning and restocking and/or when the courtesy space needs cleaning. This consolidation of information for hotel room services as to what needs to be cleaned or restocked, as well as what already has been cleaned or restocked, avoids subsequent guests from encountering leftovers.

In light of the above, it would be greatly advantageous to provide a combination refrigerator with both a vend side and a courtesy side with a full complement of sensors and network feedback, not only to record charges in real time as with Bartech's eFridge® network system, but also to keep the hotel room services department fully informed so that the hotel knows when the vend side needs replenishment, and either or both the vend side and courtesy side need cleaning, and the hotel as well knows when said cleaning/replenishment has taken place.

SUMMARY OF THE INVENTION

Accordingly, it is an object of the present invention to provide a combination (dual side-by-side) refrigerator with an interior insulated compartment for keeping items in a defined cold region, the interior compartment being partitioned into a vend-side cash bar from which cold beverage, drink cans and snacks are obtained for a fee, plus a courtesy space for non-fee storage of guest personal items.

It is another object to provide a combination refrigerator with a monitoring system networked to the front desk to allow the front desk to selectively lock/unlock the cash bar at check-in depending on guest preference and, when unlocked, to automatically invoice sales to the guest at check-out.

It is another object to provide a combination refrigerator with a monitoring system networked to both the front desk (as above) and to the hotel room services department to automatically indicate when the cash bar needs cleaning and restocking and when the courtesy space needs cleaning, thereby allowing the hotel room services department to scrupulously maintain both the vend-side cash bar (to keep it clean and stocked) and the courtesy space (to keep it clean and empty), preventing subsequent guests from discovering te prior guest's empty cans and wrappers.

It is another object to automatically provide a log to the hotel room services department to consolidate information on what needs to be cleaned or restocked, as well as what has been cleaned or restocked, thereby pinpointing which refrigerators have not been opened by guests since the last cleaning and avoiding duplicative restocking and/or cleaning.

It is still another object to help managers oversee the cleaning process by compiling a log as above inclusive of a listing of refrigerators requiring cleaning/restocking, plus the exact date upon which each refrigerator was actually cleaned/restocked.

According to the present invention, the above-described and other objects are accomplished by providing a dual side-by-side refrigerator having a cabinet bounded about five sides, and a partition for subdividing the cabinet into a courtesy section and a paid-vend section. The partition leaves an open passage between the courtesy section and paid-vend section so that both sections can be cooled by a single cooling unit (also provided). A pair of double-hung doors are mounted at the front of the cabinet, one being sized to cover the courtesy section and one being sized to cover the paid-vend section. Alternatively, a single door may be utilized to cover both sections. In addition, both paid-vend and courtesy sections are individually lined with insulating walls to maintain the cold. A corresponding insulating panel is mounted interiorly on each of the doors for forming an insulating closure with the respective insulating walls in the courtesy section and paid-vend section. An array of sensors is provided including product-removal sensors and a pair of door-open sensors mounted opposite the respective double-hung doors. A programmable controller is connected to each of the product-removal sensors and door-open sensors for compiling data therefrom.

The monitored refrigerator greatly simplifies and improves housekeeping services. Whenever a door is opened the door open sensor indicates the same to the controller, and whenever a product is removed the product removal sensor indicates that as well. The data is forwarded to a the hotel room services department and room service client terminal which compiles a list of vend items that need to be restocked, and which need to have their courtesy sections cleaned. Once the hotel room services department has cleaned and restocked the refrigerator they indicate such by input to the controller and the list is updated to reflect the date of cleaning. This particular compilation of houskeeping data on a separate hotel room services department and room service client terminal facilitates the refrigerator cleaning process because empty containers and wrapper are not left for the next guest. It simplifies the cleaning process because refrigerators which were not opened since the last cleaning need not be restocked and/or cleaned. Finally, it helps managers oversee the cleaning process because the list compilation includes the exact data upon which each refrigerator required cleaning/restocking, and the exact date upon which the refrigerator was actually cleaned/restocked.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention will be described with reference to one particular embodiment that is a combination hotel refrigerator having a vend side from which cold beverage, drink cans and snacks are obtained for a fee, plus a courtesy side for non-fee storage of guest personal items, plus a monitoring system networked to the front desk for automatically invoicing sales and to the hotel room services department for automatically alerting cleaning services to the need for refrigerator restocking and cleaning and for tracking services performed.

Figure 1:
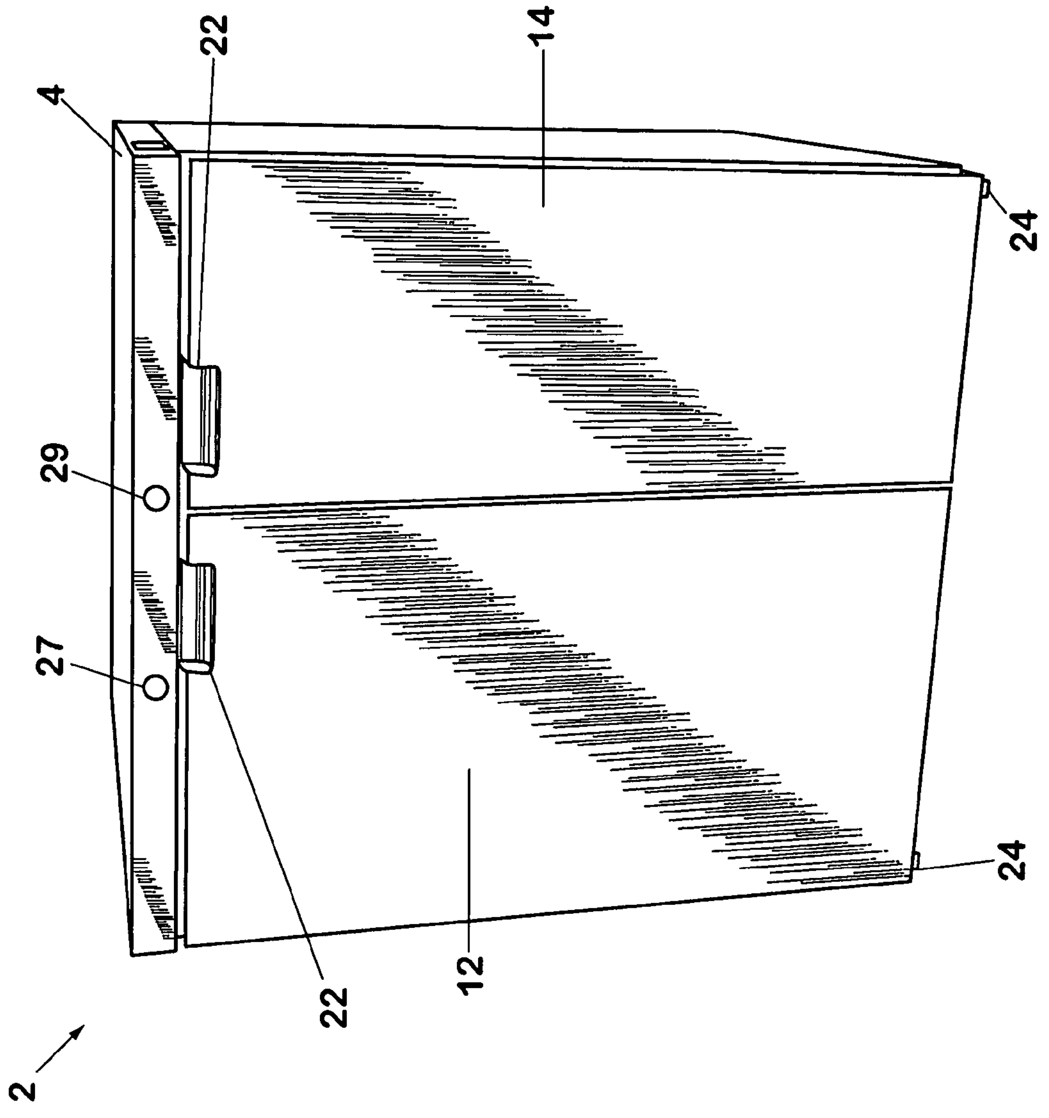
FIG. 1 is a perspective view of the combination refrigerator 2 according to the present invention.

FIG. 1 is a perspective view of the combination refrigerator 2 according to a preferred embodiment of the present invention. Refrigerator 2 generally comprises a steel reinforced cabinet 4 that is bounded around five sides, a pair of double-hung doors 12, 14 at the front of cabinet 4, a pair of handles 22 for selectively opening one or the other of doors 12, 14, a controller 6 (to be described . . . here obscured) built into a top panel 3 of cabinet 4 and connected to a visual indicator light 27 that is viewable from the front, and a panel-mounted panic switch 29 to turn the refrigeration unit off for a predetermined period of time. The unit is supported on four bottom-corner-mounted levelers (or castors) 24. One skilled in the art will understand that the pair of double-hung doors 12, 14 may be hinged at either side, or alternatively may be replaced with a single door to enclose the entire interior.

Figure 2:
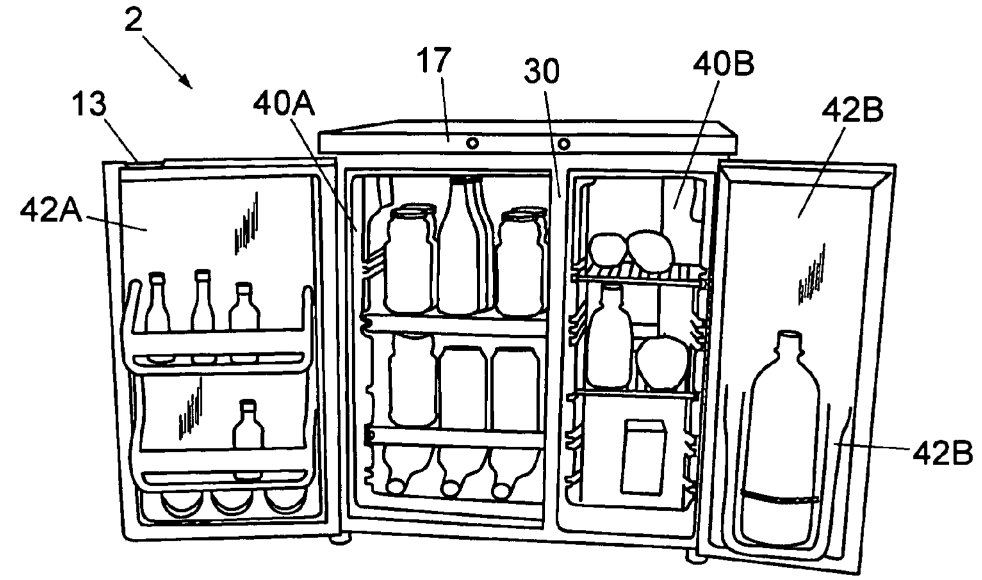
FIG. 2 is a front perspective view of the combination refrigerator 2 with doors 12, 14 open to reveal the interior configuration.

FIG. 2 is a front perspective view of the combination refrigerator 2 with doors 12, 14 open to reveal the interior configuration. A partition 30 subdivides the interior compartment into at least two subcompartments: a vend section shown at left (A) for vending beverages and snacks, and a courtesy section shown at right (B) for non-paid courtesy use of guests. The vend section (left at A) defines one or more compartments for vending snacks and sundries, and is equipped with an array of sensors (to be described) which are connected to the controller 6 and networked there through to the front desk of the hotel (such as by a conventional network interface and cables), said sensors for sensing removal of items and for recording purchases at the controller 6. The courtesy section (right at B) defines at least one compartment for guests to store their own snacks, sundries and perishables, and this section omits the sensors. Both are refrigerated sections, and both are insulated by a combination of form-fitted insulated compartments 40A & 40B which fit within the respective sections, as well as door mounted insulating panels 42A & 42B which are hung on the respective doors 12, 14 and close upon insulated compartments 40A & 40B when the doors 12, 14 are shut to fully insulate the interior sections. Both insulated compartments 40A & 40B include a pre-defined tongue and groove shelving system to arrange the items therein and to allow rearrangement of the shelves as desired. Both door mounted insulating panels 42A & 42B hung on the respective doors 12, 14 include a plurality of horizontally-extending shallow shelves bounded by retainers for insertion of cans, bottles, etc., therein. The door 12 at least on the vend section (and optionally on door 14 as well) is equipped with a latch 19 that couples to an electronically-controlled lock 17 (see also FIG. 8) inside the interior. The lock 17 is connected to controller 6, which is networked to the hotel network (as will be described) to allow the front desk to selectively lock/unlock the cash bar at check-in according to the guests preference.

Figure 3:
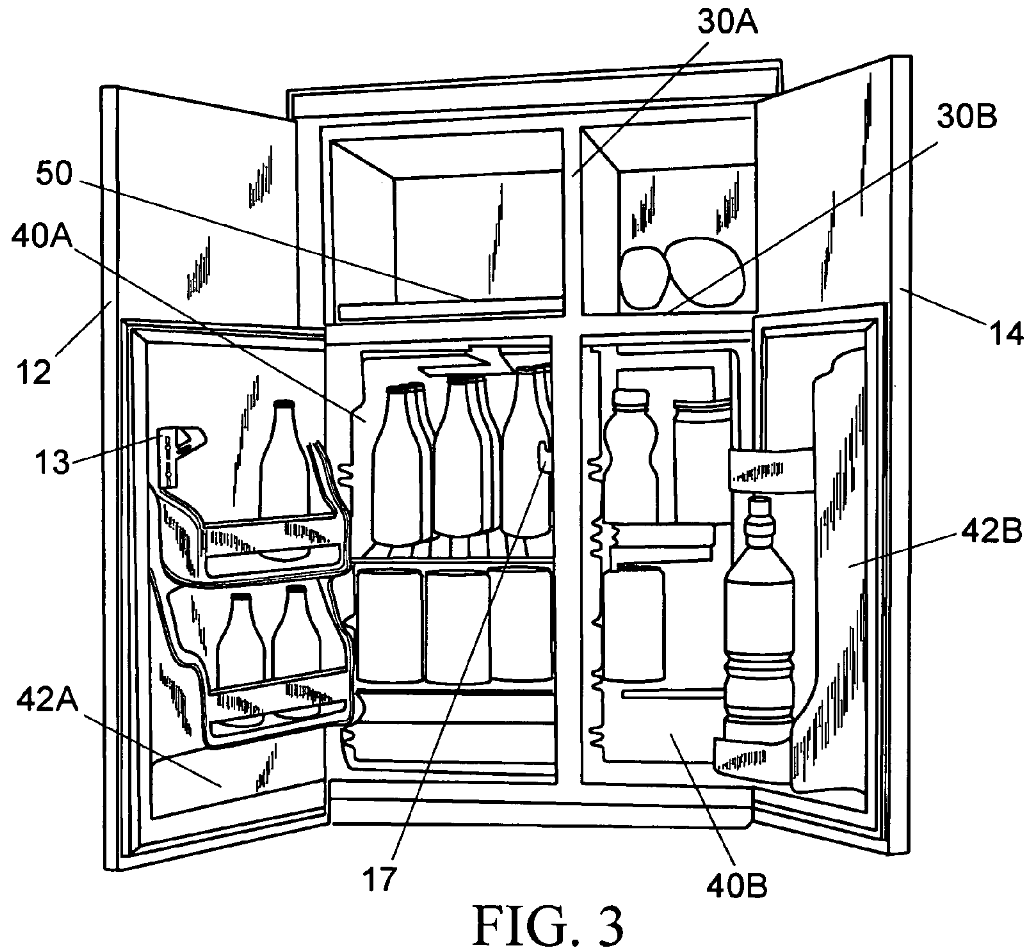
FIG. 3 is a front perspective view of an alternative embodiment similar to that shown in FIG. 2, except that the partition subdivides the interior compartment into four subcompartments.

In the alternative embodiment shown in FIG. 3, the partition 30 optionally subdivides the interior compartment into four subcompartments, the partition including a horizontal partition 30B for subdividing the interior compartment into a lower refrigerated section (for beverages and ice) and an upper dry section for snacks, and a vertical partition 30A for further subdividing the interior compartment into a vend section shown at left for vending beverages and snacks, and a courtesy section shown at right for non-paid courtesy use of guests.

The optional dry vend section (top left) defines a compartment for vending snacks and sundries, and the optional courtesy dry section (top right) can be used for storing and locking non-perishables. The paid dry section is equipped with a sensor tray 50 (to be described) which is connected to the controller 6 and networked there through to the front desk for sensing removal of items and for recording purchases. As above, the refrigerated sections are each insulated by a combination of form-fitted insulated compartments 40A & 40B which fit within the respective sections, and door mounted insulating panels 42A & 42B which are hung on the respective doors 12, 14 and close upon insulated compartments 40A & 40B when the doors 12, 14 are shut to fully insulate the interior sections. Both insulated compartments 40A & 40B include a pre-defined tongue and groove shelving system to arrange the items therein and to allow rearrangement of the shelves as desired. Both door mounted insulating panels 42A & 42B hung on the respective doors 12, 14 include a plurality of horizontally-extending shallow shelves bounded by retainers for insertion of cans, bottles, etc., therein. The door 12 at least on the vend section is equipped with a latch 19 (see also FIG. 8) that couples to an electronically-controlled lock 17 (obscured in FIG. 3) inside the interior. The lock 17 is connected to controller 6, which is networked to the hotel network (as will be described) to allow the front desk to selectively lock/unlock the cash bar at check-in according to the guests preference.

Figure 4:
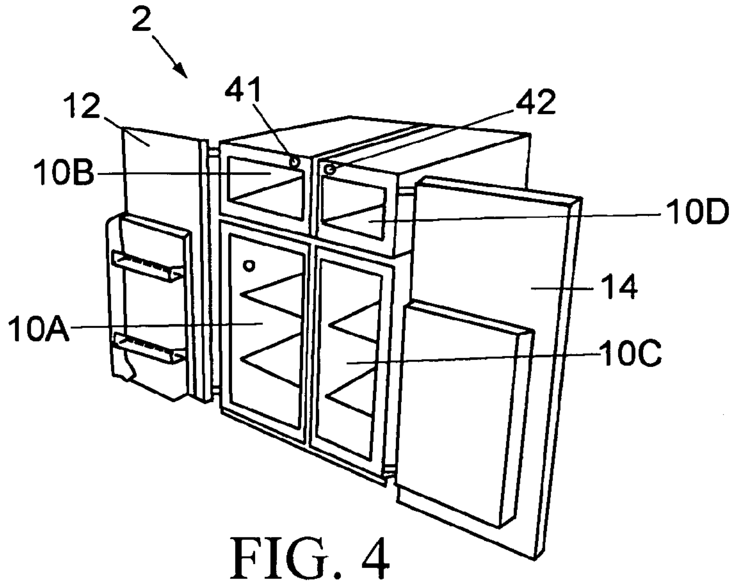
FIG. 4 is a front exploded perspective view of the combination refrigerator 2 as in FIG. 3 with doors 12, 14 open.

FIG. 4 is a front exploded perspective view of the combination refrigerator 2 with doors 12, 14 open to reveal an approximately 35 liter lower refrigerated section 10A, 15 liter upper dry section 10B for snacks, a 25 liter lower refrigerated courtesy section 10C for non-paid courtesy use of guests, and a 10 liter upper dry courtesy section 10D for non-paid courtesy use of guests. The dimensions given herein are exemplary and can be easily varied as a matter of design choice. Both the lower refrigerated section 10A and upper dry section 10B are preferably equipped with a full array of sensors (to be described) which are wired to the controller 6. In addition, a door open sensor 41 is wired to the controller 6 for detecting the opening of door 12. The lower refrigerated courtesy section 10C and upper dry courtesy section 10D are not equipped with sensors and yet a door open sensor 42 is wired to the controller 6 for detecting the opening of door 14. The purpose for this is to improve housekeeping services as will be described.

Figure 5:
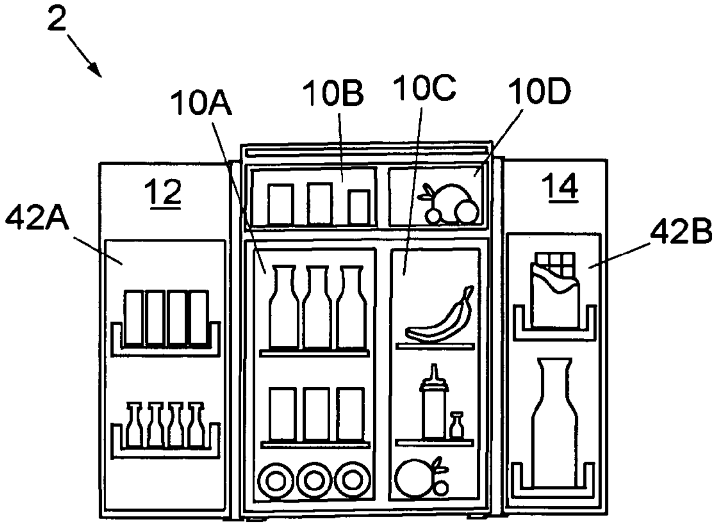
FIG. 5 is a front perspective view of the combination refrigerator 2 illustrating an exemplary arrangement of vend items and sundries.

FIG. 5 is a front perspective view of the combination refrigerator 2 illustrating an exemplary arrangement of vend items and sundries arranged in each of the lower refrigerated section 10A, upper dry section 10B, the lower refrigerated courtesy section 10C and upper dry courtesy section 10D, as well as in the door mounted insulating panels 42A & 42B.

The lower refrigerated section 10A and upper dry section 10B are equipped with a selectable array of commercially-available sensors which may include infrared sensors, micro-switch sensors, and pressure sensors, in each case for detecting removal of an individual item.

Figure 6:
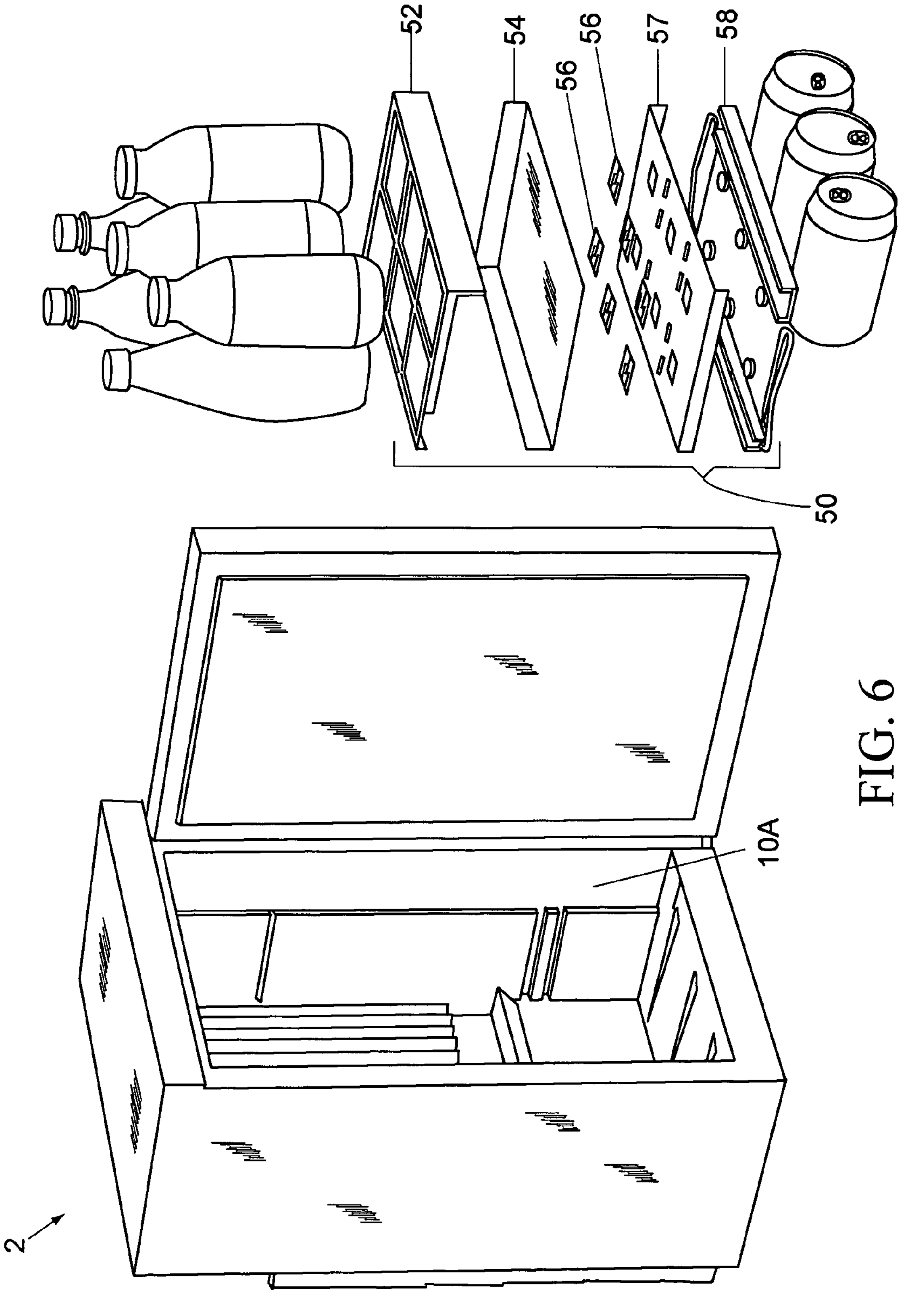
FIG. 6 is an exploded side perspective view of an exemplary sensor tray 50 which modularizes the sensors therein for more convenient installation and removal.

FIG. 6 is an exploded side perspective view of an exemplary sensor tray 50 which modularizes the sensors therein for more convenient installation and removal. Sensor tray 50 is incorporated as a slide-in module into the refrigerator 2. Sensor tray 50 generally comprises a lower support tray 58 with side brackets (adapted for slidable insertion into refrigerator 2) and a series of pressure pads (foam pads or the like), a circuit card 57 arrayed with a plurality of pressure sensors 56 surface-mounted thereon, a protective membrane 54 for protecting the circuit card 57, and a sorter 52 for segregating and arranging cans and bottles. All of the support tray 58, circuit card 57, protective membrane 54, and sorter 52 are sandwiched together for unobtrusive insertion into the paid refrigerated section 10A of refrigerator 2. A like sensor tray 50 may be incorporated into the paid dry section 10B, albeit this section typically does not include cans or bottles. Instead, lighter snacks and sundries are provided and this may necessitate slight modifications to sensor tray 50 which are a matter of design choice, such as a reconfiguration of sorter 52 for other items and use of micro-switches rather than pressure switches.

Figure 7:
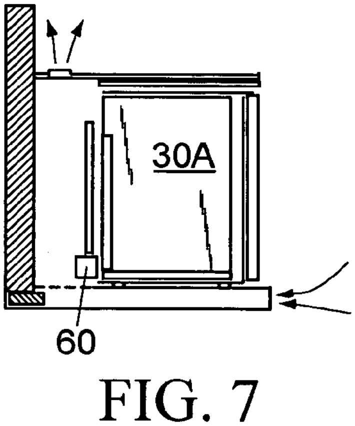
FIG. 7 is a side cross-section of the combination refrigerator 2 inclusive of the refrigeration unit 50.

FIG. 7 is a side cross-section of the combination refrigerator 2 inclusive of the refrigeration unit 50, and further illustrating a preferred built-in mounting configuration which leaves open air passages (darkened and indicated by arrows) that provide appropriate air-flow underneath and behind the unit 2. The refrigeration unit 50 is a conventional compressor, absorption cooling unit, or thermoelectric cooling unit with cooling coils extending upward behind the refrigerator 2.

By way of example, the cooling unit 50 may be a smaller version of a standard compressor-driven system found in industrial and residential cooling and refrigeration systems. It is comprised of an electrically powered compressor that pumps a 'CFC-free' refrigerant R-134A or R-600 through a sealed system. As the refrigerant gas is compressed and then allowed to expand, heat is extracted from within the refrigerator 2. The cooling unit 50 is electronically controlled by controller 6 to cycle between compressor-on and -off cycles. An electronically controlled thermostat located within the refrigerator and controlled by controller 6 regulates power to the unit 50, and the system is factory-set to maintain an internal temperature of between 42° F. and 48° F. This configuration also allows for temperature adjustments corresponding to both high and low charge periods, and to allow fine-tuning of the cylces to account for vacant rooms, occupied rooms and rooms that are out of order. In addition, an electronic guest-controlled shut-off (override) is provided that allows the cooling unit 50 to be turned off if so desired via the touch display of controller 6. In this case the cooling system 50 is reactivated during its next compressor-on cycle. A suitable compressor-cooling unit is available from the Danfoss Corporation (e.g., compressor unit PL30F).

Alternately, the cooling unit 50 may be an Absorption Cooling Unit which is a sealed system that works on the principle of expansion and contraction of an ammonia/water mixture (water is less likely to promote bacterial growth than glycol) and its corresponding pressure drop which provides heat extraction. There are no moving parts within the system as it utilizes a heating element to provide the energy required to circulate the mixture. The thermostat and control hook-up are as described above.

As still another alternative, a thermoelectric cooling unit (heat pump) may be used, and a variety of suitable thermoelectric cooling modules are commercially available.

In any of the foregoing cases suitable cooling units complete with coils (as needed), capacitors, thermostats and on-board control circuitry and wiring.

As seen in FIG. 7, the vertical partition 30A inside refrigerator 2 leaves approximately a ½" clearance (darkened and indicated by arrows) at the back of the interior compartment to allow circulation of cooled air between the lower refrigerated section 10 and lower refrigerated courtesy section 10C. This allows both refrigerated sections to be cooled by a single cooling unit 50. The horizontal partition 30B seals off the upper sections 10B and 10D to prevent unwanted escape of cooled air into those dry sections.

Typically, the refrigerator 2 will be built into existing cabinetry at the hotel, and in such case the clearance duct should be provided at the rear to allow escape of vented hot air (indicated by arrows). The refrigerator sits upon levelers 24 (or castors) which are inserted into the bottom of the refrigerator and these provide a selectable measure of ground clearance to further facilitate the free flow of air across the coils.

Another optional feature is an icemaker, which if provided is done so in a known manner by incorporation in the cooled courtesy section 10C.

Figure 9:
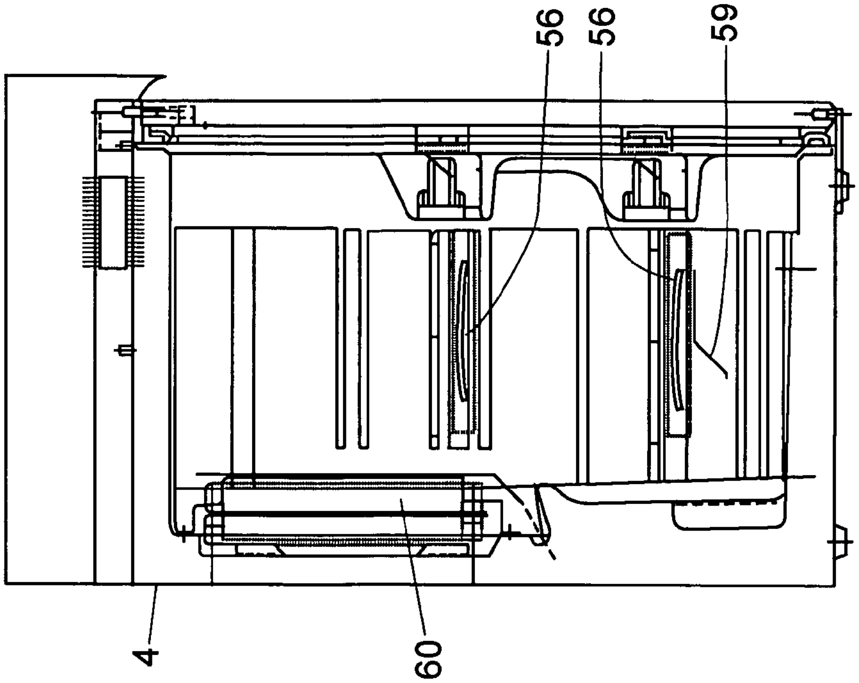
FIG. 9 is a side cross-section of the interior compartment as in FIG. 8.
Figure 8:
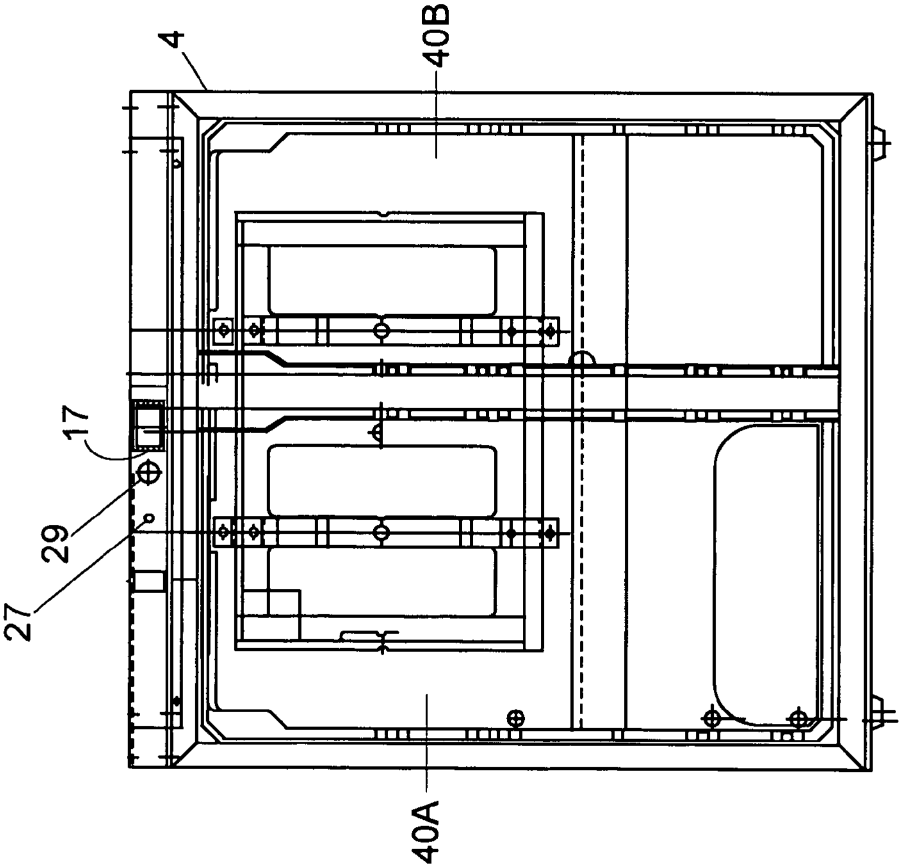
FIG. 8 is a partial front view of the interior compartment of refrigerator cabinet 4 with form-fitted insulated compartments 40A & 40B inserted therein.

FIG. 8 and FIG. 9 are a partial front view and side cross-section, respectively, of the interior compartment of refrigerator cabinet 4 with form-fitted insulated compartments 40A & 40B inserted therein. Also seen in FIG. 9 a eutectic device 60 is provided as an optional feature and yet preferred feature. Eutectic device 60 is a cold-storage cell which may be incorporated along the floor of the cabinet 4 or along the back wall (as shown) or side walls thereof. Eutectic device 60 minimizes compressor cycles, typically allowing two cycles of 3 hours, by virtue of serving as a ‘cold sink’ inside the refrigerated compartments. The eutectic device 60 is identical to the cold packs that are frozen and placed inside beverage coolers to sustain cold temperatures. It is a hollow member filled with a water-based solution that freezes during the compressor-on cycle. During compressor-off cycles, the eutectic device 60 maintains the cold temperature.

In addition to pressure sensors 56 described above, FIG. 9 illustrates a flapper sensor 59 for detecting removal of a 2-liter bottle from dedicated recess therefor.

Figure 10:
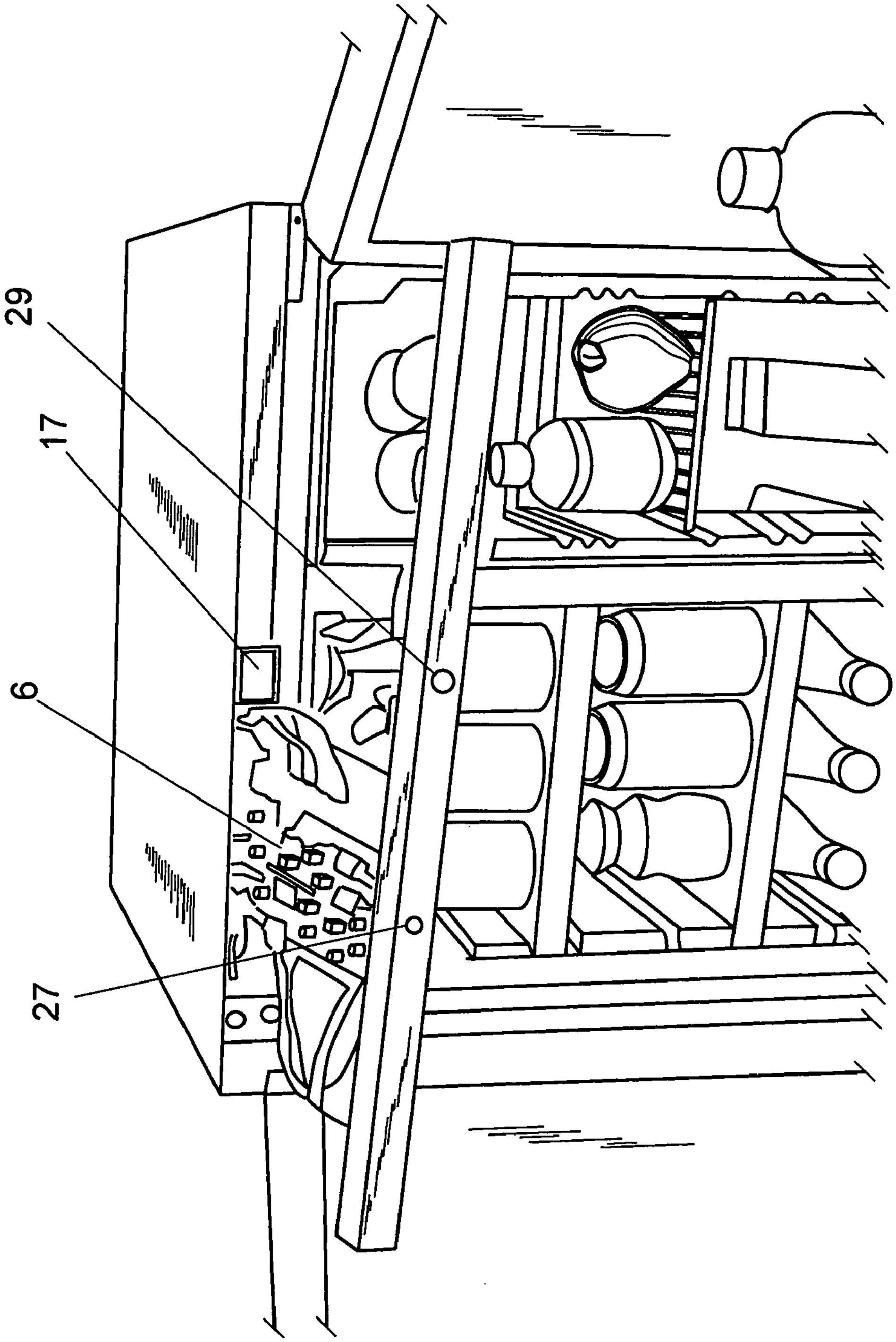
FIG. 10 is a perspective illustration of the controller 6 partially removed from beneath the top panel of the refrigerator cabinet 4.

FIG. 10 is a perspective illustration of the controller 6 partially removed from beneath the top panel of the refrigerator cabinet 4. The controller 6 may be a standard microprocessor programmable control card with necessary peripherals, an LED panel-mount indicator light 27 to display normal operation, and a communication port such as an RS-232 port (with RJ45 connector) or the like. Preferably, the controller 6 is also connected to a panel-mounted panic switch 29 to turn the refrigeration unit off for a predetermined period of time. As stated previously, all sensors in both the lower refrigerated section 10A and upper dry section 10B are wired to the controller 6, as are the door open sensors 41, 42. Each controller 6 in each refrigerator 2 is networked to the hotel network. Controller 6 may be programmed with an on-board touch pad, or alternatively controller 6 may be that which is provided in the Bartech eFridge® system which is controlled by an infrared remote control.

Figure 11:
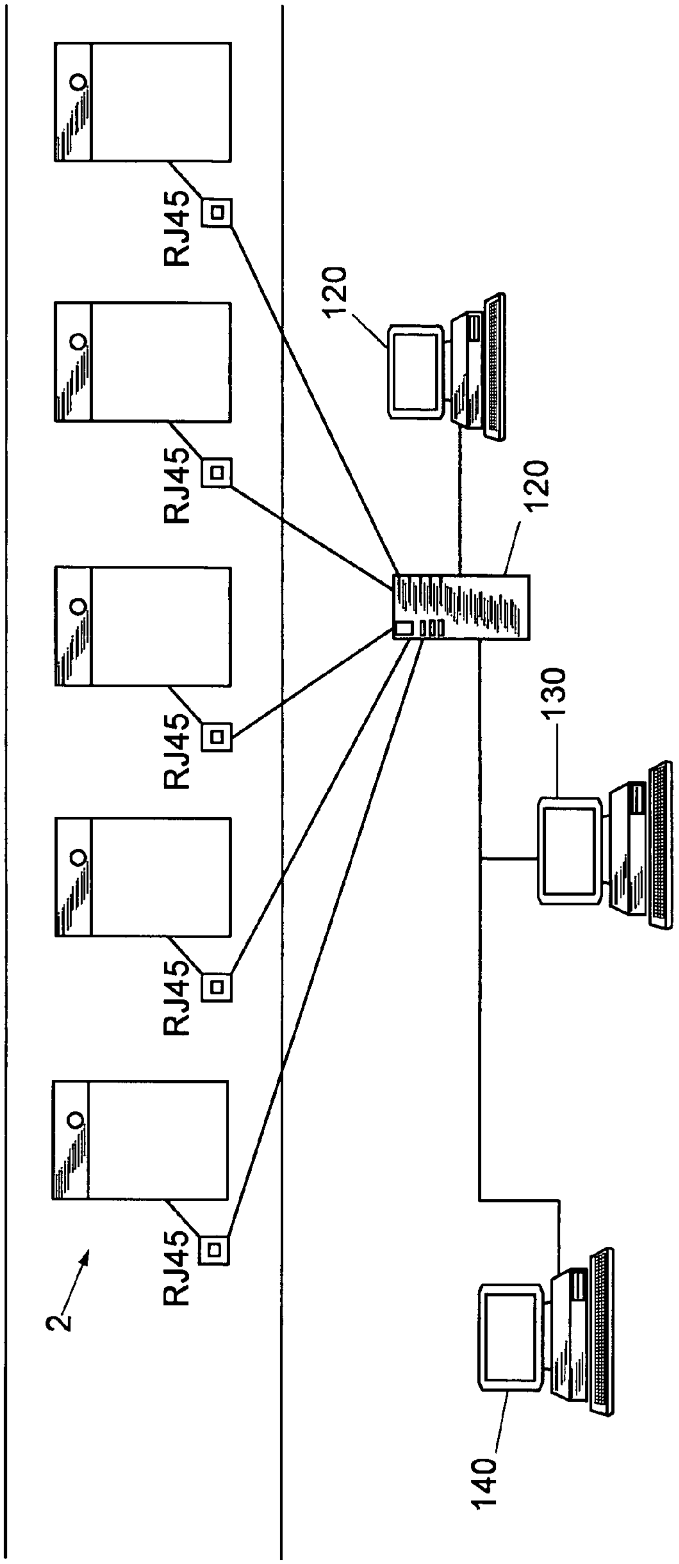
FIG. 11 is a diagram of an exemplary network architecture.

FIG. 11 is a diagram of an exemplary network architecture, and it can be seen that each controller 6 in each refrigerator 2 is networked to the hotel server 120, and to client terminals for online repair services 130, and to the hotel room services department 140. The purpose of the hotel room services department connection is to simplify and improve housekeeping services.

In the context of the present combination refrigerator 2 (with paid and courtesy sections) this hotel room services function is carried out with a particular logic. Whenever the door 12 is opened the door open sensor 41 indicates the same to the controller 6 and the controller 6 monitors whether a vend item is removed. If a vend item is removed it is sensed by the appropriate sensor and controller 6 then monitors the time of removal. If returned to its position the controller 6 does not register a sale, but if the item stays removed for greater than one minute a sale is registered and the information is relayed to the hotel front desk for invoicing. In accordance with the present invention, the data is also forwarded to the hotel room services department client terminal 140 which compiles a list of vend items that need to be restocked. Likewise, whenever the courtesy door 14 is opened the door open sensor 42 indicates the same to the controller 6. In accordance with the present invention, this data is also forwarded to the the hotel room services department and room service client terminal 140 which compiles a list of refrigerators 2 which need to have their courtesy sections 10C, 10D cleaned. Once the hotel room services department has cleaned and restocked the refrigerator 2 they indicate such by inputting a code to the touch pad of controller 6 (or remote control), and the list display on room service client terminal 140 is updated to reflect the date of cleaning. This results in a log file for display on the hotel room services department client terminal 140 that facilitates the refrigerator cleaning process because empty containers and wrapper are not left for the next guest. It also simplifies the cleaning process because refrigerators which were not opened since the last cleaning are indicated on the log file and need not be restocked and/or cleaned. Finally, it helps managers oversee the cleaning process because the list compilation includes the exact date upon which each refrigerator 2 required cleaning/restocking, and the exact date upon which the refrigerator 2 was actually cleaned/restocked.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A dual side-by-side refrigerator, comprising:

a cabinet bounded about five sides;

a partition for subdividing said cabinet into a courtesy section and a paid-vend section, said partition leaving an open passage between said courtesy section and a paid-vend section;

at least one door mounted by hinges at the front of said cabinet and sized to cover the courtesy section and paid-vend section;

insulating walls substantially lining each of the courtesy section and paid-vend section in said cabinet;

insulating panels mounted interiorly on each of said doors for forming an insulating closure with the respective insulating walls in the courtesy section and paid-vend section of said cabinet;

a cooling unit for cooling both of said courtesy section and a paid-vend section;

a plurality of vend sensors in said paid-vend section;

at least one door-open sensor mounted opposite the door hinge each for detecting when said door has been opened for access to the courtesy section and paid-vend section;

a programmable controller connected to each of said vend sensors and door-open sensors for compiling data therefrom.

2. The dual side-by-side refrigerator according to claim 1, wherein said a partition further includes a vertical partition for subdividing said cabinet into a courtesy section and a paid-vend section, and a horizontal partition for further subdividing said cabinet into a cold section and a dry section.

3. The dual side-by-side refrigerator according to claim 1, wherein said controller further includes a data communication port for communication with a hotel room services department computer.

4. The dual side-by-side refrigerator according to claim 3, wherein said controller populates a list of refrigerators at said hotel room services department computer which have had their courtesy section doors open since their last cleaning.

5. The dual side-by-side refrigerator according to claim 4 wherein said list compilation indicates the exact date upon which each refrigerator required cleaning/restocking, and the exact date upon which the refrigerator was actually cleaned/restocked.

6. A dual side-by-side refrigerator, comprising:

a cabinet bounded about five sides;

a partition for subdividing said cabinet into a courtesy section and a paid-vend section, at least one door mounted by hinges at the front of said cabinet and sized to cover the courtesy section and paid-vend section;

insulation at least partially lining each of the courtesy section and paid-vend section in said cabinet, and an interior of said at least one door for forming an insulating closure with the respective insulating walls in the courtesy section and paid-vend section of said cabinet;

a cooling unit for cooling both of said courtesy section and a paid-vend section;

a plurality of vend sensors in said paid-vend section;

at least one door-open sensor mounted proximate said at least one door for detecting when said door has been opened for access to the courtesy section and paid-vend section;

an electronic lock for remotely locking and unlocking said at least one door; and a programmable controller connected to each of said vend sensors, door-open sensors and electronic lock for compiling data from said sensors, said controller including a data communication port for communication with at least one remote front desk computer for allowing remote locking and unlocking by said front desk in accordance with guest preference.

7. The dual side-by-side refrigerator according to claim 6, wherein said a partition further Includes a vertical partition for subdividing said cabinet into a courtesy section and a paid-vend section, and a horizontal partition for further subdividing said cabinet into a cold section and a dry section.

8. The dual side-by-side refrigerator according to claim 7, wherein said data communication port is additionally in communication with a hotel room services department computer for providing said compiled data to said hotel room services department.

9. The dual side-by-side refrigerator according to claim 8, wherein said controller populates a list of refrigerators at said hotel room services department computer that have had their courtesy section doors opened since their last cleaning.

10. The dual side-by-side refrigerator according to claim 9, wherein said list compilation indicates the exact date upon which each refrigerator required cleaning/restocking, and the exact date upon which the refrigerator was actually cleaned/restocked.

11. A dual side-by-side refrigerator, comprising:

a cabinet bounded about five sides to define an interior compartment;

a partition for subdividing said cabinet into four subcompartments, the partition including a horizontal partition for subdividing the interior compartment into a lower refrigerated section for beverages and ice and an upper dry section for snacks, and a vertical partition for further subdividing both the lower refrigerated section and upper dry section into a vend section for vending beverages and snacks, and a courtesy section for non-paid courtesy use of guests;

insulating walls substantially lining each of the lower refrigerated vend and lower refrigerated courtesy sections in said cabinet;

a sensor tray in said lower refrigerated vend section and connected to a controller for sensing removal of items and for recording purchases only from the vend section but not from said courtesy section, thereby allowing non-paid courtesy use of said courtesy section by guests;

at least one door mounted by hinges at the front of said cabinet and sized to cover all of said four subcompartment; and at least one door-open sensor mounted proximate said at least one door and to said controller for detecting when said door has been opened for access to the courtesy section and paid-vend section.

12. The dual side-by-side refrigerator according to claim 11, further comprising a sensor tray in said upper dry vend section and connected to a controller for sensing removal of items and for recording purchases.

13. The dual side-by-side refrigerator according to claim 11, wherein said at least one door further comprises two double-hung doors, a first door covering both said upper dry vend section and said lower refrigerated vend section, and a second door covering both said upper dry courtesy section and said lower refrigerated courtesy section.

14. The dual side-by-side refrigerator according to claim 13, further comprising two door-open sensors connected to said controller for detecting opening of the corresponding two doors.

15. A dual side-by-side refrigerator, comprising:

a cabinet bounded about five sides to define an interior compartment;

a programmable controller; and a modular sensor tray supported in said cabinet, said sensor tray including a lower support tray with side brackets adapted for slidable insertion into said cabinet, a plurality of pressure pads mounted on said lower support tray, a circuit card arrayed with a plurality of pressure sensors mounted on said lower support tray and each connected to said programmable controller, a protective membrane covering the circuit card, and a sorter for segregating cans and bottles mounted on said lower support tray atop said protective membrane.

16. The dual side-by-side refrigerator according to claim 15, wherein said controller includes a data communication port for communication with at least one remote front desk computer.

* * * * *